United States Patent [19]
Lee

[11] Patent Number: 5,638,129
[45] Date of Patent: Jun. 10, 1997

[54] IMAGE PROCESSING APPARATUS USING A PIXEL-BY-PIXEL MOTION ESTIMATION BASED ON FEATURE POINTS

[75] Inventor: Min-Sup Lee, Seoul, Rep. of Korea

[73] Assignee: Daewoo Electronics Co. Ltd., Seoul, Rep. of Korea

[21] Appl. No.: 527,590

[22] Filed: Sep. 13, 1995

[30] Foreign Application Priority Data

Mar. 20, 1995 [KR] Rep. of Korea .................. 94-5859

[51] Int. Cl.$^6$ .................................................. H04N 7/36
[52] U.S. Cl. ........................................ 348/416; 348/699
[58] Field of Search ................................ 348/699, 413, 348/416; H04N 7/36

[56] References Cited

U.S. PATENT DOCUMENTS 5,546,129  8/1996  Lee ............................................ 448/416

*Primary Examiner*—Howard W. Britton
*Attorney, Agent, or Firm*—Pennie & Edmonds

[57] ABSTRACT

An apparatus, for use in a motion-compensated video signal encoder, for determining a predicted current frame based on a current and a previous frame, comprises: a feature point motion vector(MV) detector for detecting a first set of MVs for feature points; an edge point MV detector for, in each of the edges, detecting one or two neighboring feature points for each of edge points, and determining a second set of MVs for the edge points; a quasi-point detector for detecting quasi-feature points and a third set of MVs therefor, and detecting quasi-edge points and a fourth set of MVs therefor; a non-quasi-point MV detector for detecting a fifth set of MVs for all non-quasi-points, each of the fifth set of MVs being determined by averaging the MVs of one or more neighboring quasi-feature points for each of the non-quasi-points; an arrangement block for arranging the third, the fourth and the fifth sets of MVs to determine a group of MVs for all of the pixels in the current frame; and a motion compensator for providing a pixel value from the previous frame based on the position data of each pixel in the current frame and a MV thereof.

3 Claims, 3 Drawing Sheets

IMAGE PROCESSING APPARATUS USING A PIXEL-BY-PIXEL MOTION ESTIMATION BASED ON FEATURE POINTS

FIELD OF THE INVENTION

The present invention relates to an apparatus for encoding a video signal; and, more particularly, to an apparatus for encoding a video signal using a pixel-by-pixel motion estimation based on feature points.

DESCRIPTION OF THE PRIOR ART

As is well known, transmission of digitized video signals can deliver video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and a previous frame, and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12 (Dec. 1985); and in Ninomiya and Ohtsuka, "A Motion-Compensated Interframe Coding Scheme for Television Pictures", *IEEE Transactions on Communications*, COM-30, No. 1 (Jan. 1982).

Specifically, in the motion compensated DPCM, current frame data is predicted from the corresponding previous frame data based on an estimation of a motion between the current and the previous frames. Such estimated motion may be described in terms of two dimensional motion vectors representing the displacement of pixels between the previous and the current frames.

There have been two basic approaches to estimate the motion or displacement of pixels of an object: one is a block-by-block estimation; and the other is a pixel-by-pixel approach.

In the block-by-block motion estimation, a block in the current frame is compared with blocks in its previous frame until a best match is determined. From this, an interframe displacement vector (which indicates how much the block of pixels has moved between the frames) for the whole block can be estimated. However, in the block-by-block motion estimation, poor estimates may result if all pixels in the block do not move in a same way, to thereby decrease the overall coding efficiency.

In case of the pixel-by-pixel estimation, on the other hand, a displacement is determined for each and every pixel. Accordingly, this technique allows a more accurate estimation of pixel values and has the ability to easily handle scale changes (e.g., zooming, movement perpendicular to the image plane). However, in the pixel-by-pixel approach, since a motion vector is determined at each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point-based motion estimation method.

In the feature point-based motion estimation technique, motion vectors for a set of selected pixels, i.e., feature points, are transmitted to a receiver, wherein each of the feature points is defined as a pixel capable of representing its neighboring pixels so that motion vectors for non-feature points can be recovered or approximated from those of the feature points at the receiver.

In an encoder which adopts the motion estimation based on feature points, as disclosed in a copending commonly owned application, U.S. Ser. No. 08/367,520, entitled "Method and Apparatus for Encoding a Video Signal Using Pixel-by-Pixel Motion Estimation", a number of feature points are first selected from the pixels contained in the previous frame. Then, a first set of motion vectors for the selected feature points are determined, wherein each of the motion vectors represents a spatial displacement between one feature point in the previous frame and a corresponding matching point, i.e., a most similar pixel, in the current frame. The most similar pixel in the current frame is called a quasi-feature point. Thereafter, a second set of motion vectors for all of the pixels contained in the current frame is determined by using said first set of motion vectors. That is, one part of the second set of motion vectors for quasi-feature points is first determined by converting each of the first set of motion vectors; and the remaining part of the second set of motion vectors for non-quasi-feature points is determined by averaging the motion vectors for the quasi-feature points which are placed within a predetermined size of circular boundary.

Since the remaining part of the second set of motion vectors for non-quasi-feature points is determined without employing any actual information relative to the real motion of an object, it may not be able to accurately estimate the motion vectors for the non-quasi-feature points.

SUMMARY OF THE INVENTION

It is, therefore, a primary object of the invention to provide an improved video signal encoding apparatus using a pixel-by-pixel motion estimation based on feature points, which is capable of accurately estimating the motion vectors for non-quasi-feature points through the use of edge information.

In accordance with the invention, there is provided an improved apparatus, for use in a motion-compensated video signal encoder, for determining a predicted current frame based on a current frame and a previous frame of a digital video signal, comprising:

an edge detector for detecting edge points representative of pixels forming edges of an image in the previous frame;

a feature point selector for selecting a number of pixels among the edge points in the previous frame as feature points;

a feature point motion vector detector for detecting a first set of motion vectors for the feature points, each of the first set of motion vectors representing a spatial displacement between one of the feature points and a most similar pixel thereto in the current frame;

an edge point motion vector detector for, in each of the edges, detecting one or two neighboring feature points for each of the non-selected edge points, and detecting a second set of motion vectors for the non-selected edge points, each of the second set of motion vectors being determined by averaging the motion vectors of the one or two neighboring feature points;

a quasi-point selector for detecting quasi-feature points in the current frame corresponding to the feature points and a third set of motion vectors for the quasi-feature points based on each of the first set of motion vectors and detecting quasi-edge points in the current frame based on each of the second set of motion vectors and a fourth set of motion vectors for the quasi-edge points;

a non-quasi-point motion vector detector for detecting a fifth set of motion vectors for all non-quasi-edge and non-quasi-feature points, each of the fifth set of motion vectors being determined by averaging the motion vectors of one or more neighboring quasi-feature points for each of the non-quasi-edge and non-quasi-feature points, wherein the one or more neighboring quasi-feature points are placed within a circular boundary having a combined radius of the distance from each of the non-quasi-edge and non-quasi-feature points to a nearest quasi-feature point corresponding thereto and a predetermined distance;

an arrangement block for arranging the third, the fourth and the fifth sets of motion vectors to determine a group of motion vectors for all of the pixels in the current frame; and a motion compensator for providing a pixel value from the previous frame based on the position data of each pixel in the current frame and a motion vector thereof, to thereby determine the predicted current frame.

BRIEF DESCRIPTION OF THE DRAWINGS

The above and other objects and features of the present invention will become apparent from the following description of preferred embodiments when taken in conjunction with the accompanying drawings, in which.

DETAILED DESCRIPTION OF THE PREFERRED EMBODIMENTS

Figure 1:
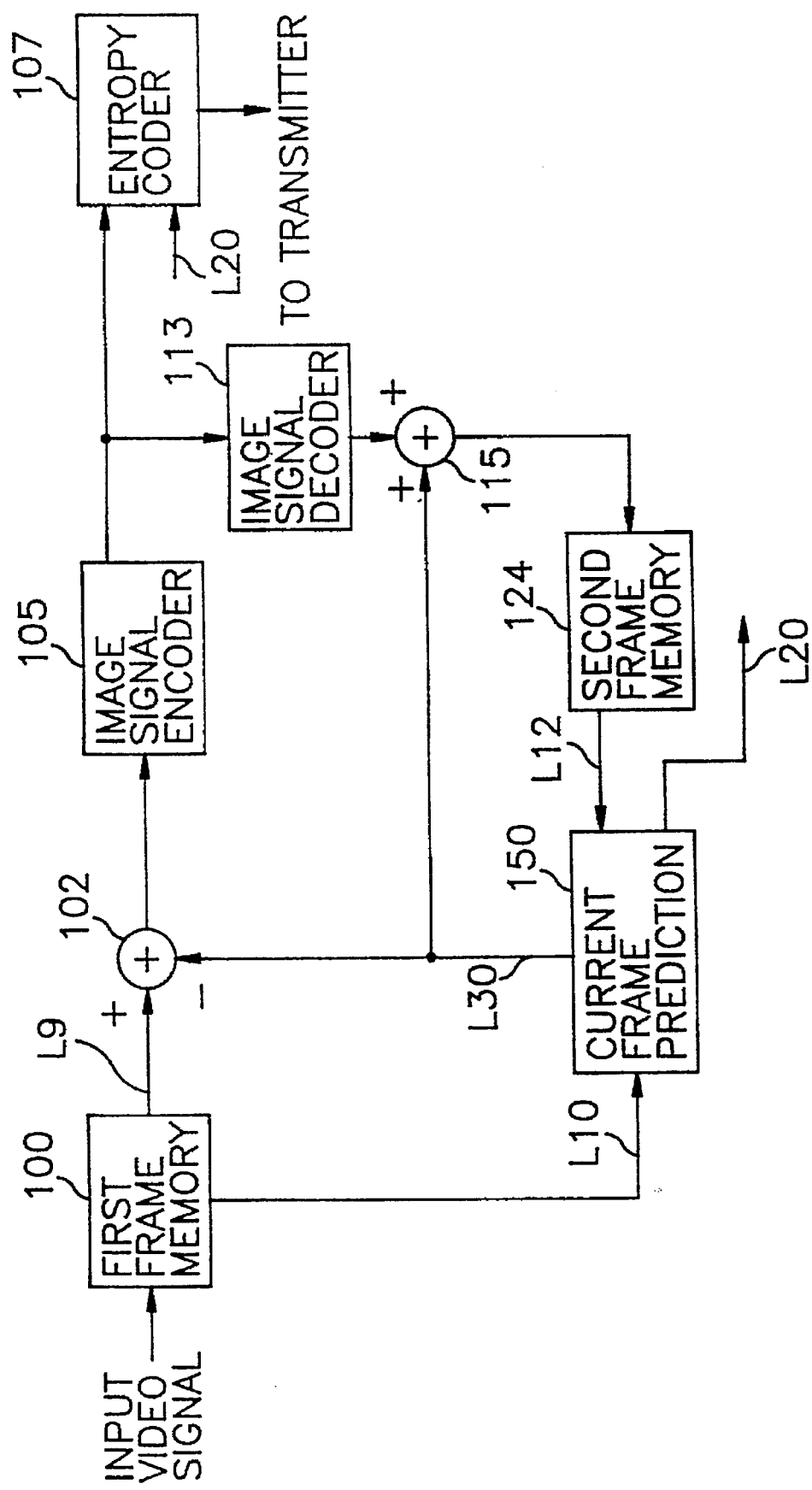
FIG. 1 is an image signal encoding apparatus having a current frame prediction block of the present invention.

FIG. 1 describes a preferred embodiment of the inventive image signal encoding apparatus. As shown in FIG. 1, a current frame signal of an input video signal is stored in a first frame memory 100 which is connected to a subtractor 102 through a line L9 and to a current frame prediction block 150 through a line L10.

In the current frame prediction block 150, a current frame signal on the line L10 retrieved from the first frame memory 100 and a reconstructed previous frame signal on a line L12 from a second frame memory 124 are processed to predict the current frame by using feature points to generate a predicted current frame signal onto a line L30 and a set of motion vectors for the feature points onto a line L20, respectively. Details of the current frame prediction block 150 will be described with reference to FIG. 2.

The predicted current frame signal on the line L30 is subtracted from the current frame signal on the line L9 at the subtractor 102, and the resultant data, i.e., an error signal denoting differential pixel values between the current and the predicted current frame signals, is dispatched to an image signal encoder 105, wherein the error signal is encoded into a set of quantized transform coefficients by using, e.g., a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors transmitted through the line L20 from the current frame prediction block 150 are coded together by using, e.g., a variable length coding technique. Thereafter, the coded signal is provided to a transmitter(not shown) for the transmission thereof.

In the meantime, the image signal decoder 113 converts the quantized transform coefficients from the image signal encoder 105 back to a reconstructed error signal by employing an inverse quantization and an inverse discrete cosine transform. The reconstructed error signal from the image signal decoder 113 and the predicted current frame signal on the line L30 from the current frame prediction block 150 are combined at an adder 115 to thereby provide a reconstructed current frame signal to be stored as a previous frame in the second frame memory 124.

Figure 2:
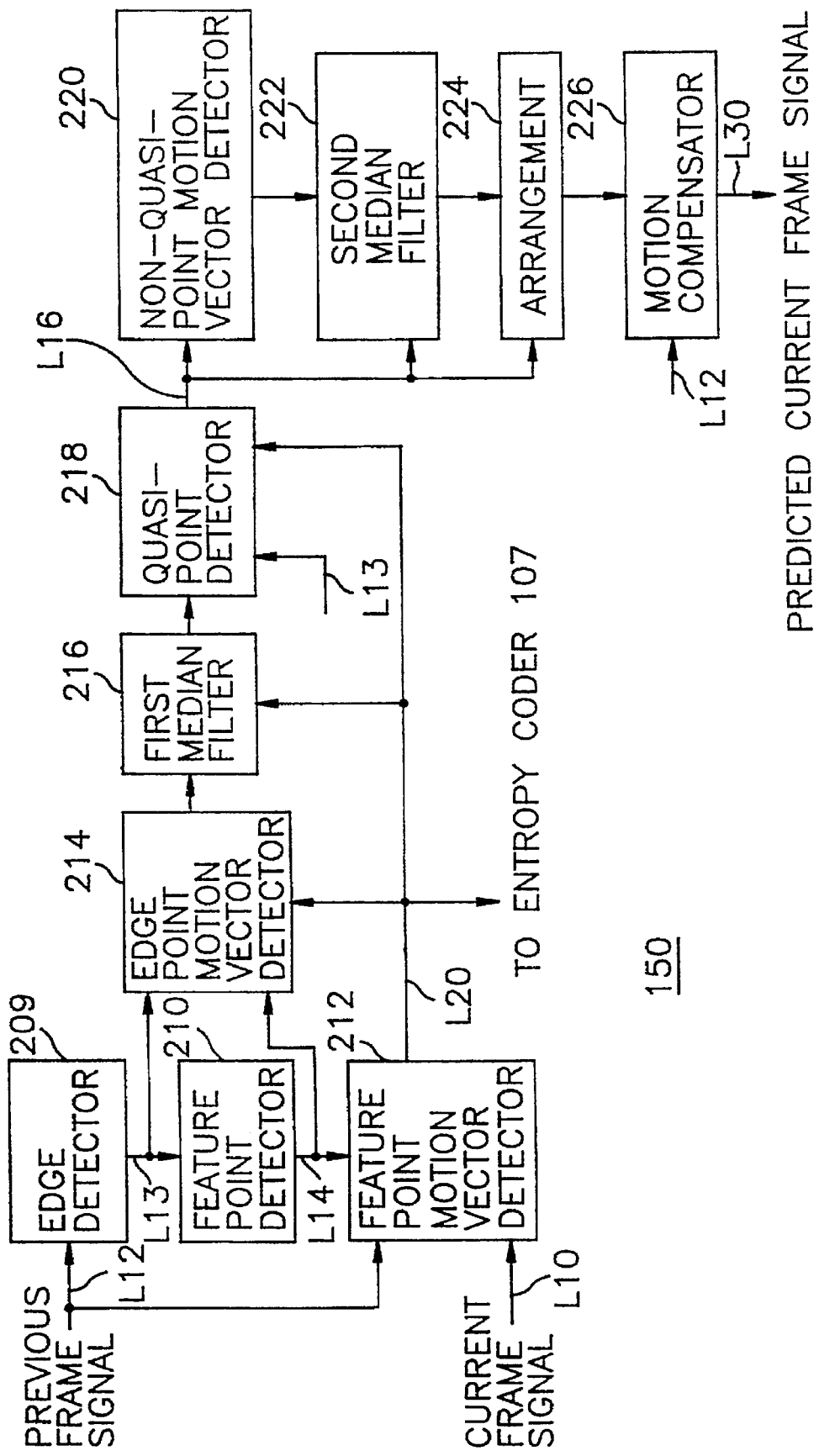
FIG. 2 shows a detailed block diagram of the current frame prediction block of FIG. 1.

Referring now to FIG. 2, there are illustrated details of the current frame prediction block 150 shown in FIG. 1. As shown in FIG. 2, a previous frame signal on the line L12 is provided to an edge detector 209 and a feature point motion vector detector 212, respectively. At the edge detector 209, a number of edge points representative of pixels forming edges of an image in the previous frame are detected through a conventional edge detection technique. The edge points in the previous frame are provided on a line L13 to a feature point detector 210, an edge point motion vector detector 214 and a quasi-point detector 218.

At the feature point detector 210, a plurality of feature points are detected among the edge points from the edge detector 209. In a preferred embodiment of the present invention, the feature points are selected at the intersection points of grid points and the edge points. The detection method is disclosed in a copending commonly owned application, U.S. Ser. No. 08/367,520, entitled "Method and Apparatus for Encoding a Video Signal Using Pixel-by-Pixel Motion Estimation", which is incorporated herein by reference in its entirely. The feature points from the feature point detector 210 are provided on a line L14 to the feature point motion vector detector 212 and the edge point motion vector detector 214.

At the feature point motion vector detector 212, a first set of motion vectors for the feature points is detected. Each of the first set of motion vectors represents a spatial displacement between a feature point in the previous frame and a most similar pixel thereto in the current frame called as a quasi-feature point. To detect a motion vector between a feature point and a quasi-feature point, there is used a block matching algorithm. That is, when a feature point is received from the feature point detector 210, a feature point block having the feature point at the center thereof, e.g., 5×5 pixels of the previous frame, is retrieved via the line L12 from the second frame memory 124(shown in FIG. 1). Thereafter, the motion vector for the feature point block is determined after a similarity calculation between the feature point block and each of a plurality of equal-sized candidate blocks included in a generally larger search region, e.g., 10×10 pixels, of the current frame retrieved from the first frame memory 100 (shown in FIG. 1). The determined motion vector for the feature point block is assigned as the motion vector of the feature point contained in that feature point block.

After detecting the motion vectors for all of the feature points, the first set of motion vectors is provided to the edge point motion vector detector 214, a first median filter 216, a quasi-point detector 218 and the entropy coder 107(shown in FIG. 1) via the line L20.

Figure 3:
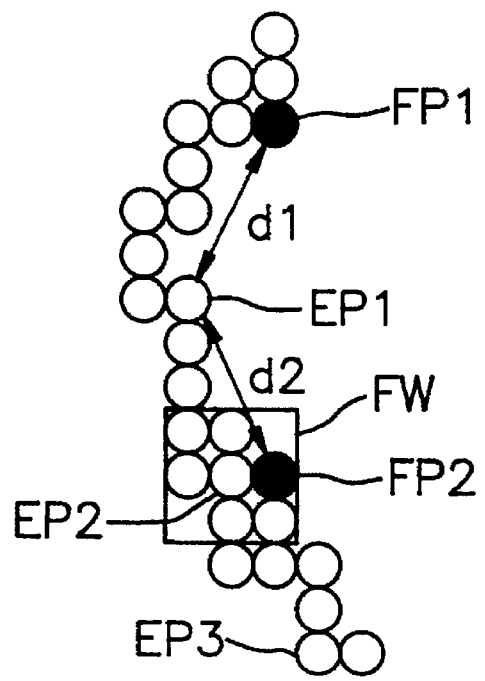
FIG. 3 describes a method for determining the motion vectors for edge points excluding feature points on each of the edges.

In the meantime, based on the edge points, the feature points and the first set of motion vectors for the feature points, the edge point motion vector detector 214 detects a second set of motion vectors for the edge points excluding the feature points. The edge points excluding the feature points, hereinafter, are called non-selected edge points. Referring to FIG. 3 at this time, there is illustrated a method of detecting a second set of motion vectors for the non-selected edge points lying on an exemplary edge. As shown in FIG. 3, there are a number of open and filled-in closed circles forming the exemplary edge. The filled-in circles represent the feature points and the open circles illustrate the non-selected edge points. In order to detect each of the second set of motion vectors, first, one or two neighboring feature points are detected for each of the non-selected edge points. In general, a non-selected edge point, e.g., EP1, has two neighboring feature points, e.g., FP1 and FP2. However, if the edge is of open loop and a non-selected edge point lies at an end portion thereof, the non-selected edge point, e.g., EP3, has only one neighboring feature point, e.g., FP2. And then, each of the second set of motion vectors is detected by averaging the motion vectors for the one or two neighboring feature points corresponding to each of the non-selected edge points. For instance, the motion vector for the non-selected edge point EP1 is determined by averaging the motion vectors for the two neighboring feature points FP1 and FP2. The motion vector $(MV_x, MV_y)_{EP1}$ for the non-selected edge point EP1 may be determined as:

$$(MV_x, MV_y)_{EP1} = \frac{\frac{1}{d1}(MV_x, MV_y)_{FP1} + \frac{1}{d2}(MV_x, MV_y)_{FP2}}{\frac{1}{d1} + \frac{1}{d2}} \quad \text{Eq. (1)}$$

wherein d1 and d2 are the distances from the non-selected edge point EP1 to the feature points FP1 and FP2, respectively; and $(MV_x, MV_y)_{FP1}$ and $(MV_x, MV_y)_{FP2}$ are motion vectors for the feature points FP1 and FP2 with $MV_x$ and $MV_y$ being the horizontal and vertical components of a motion vector.

In case that a given non-selected edge point, e.g., EP3, has only one neighboring feature point, e.g. FP2, the motion vector for the non-selected edge point EP3 is determined by the feature point FP2 only. That is, the value of the motion vector for EP3 is identical to that of the motion vector for FP2. The second set of motion vectors for the non-selected edge points is sent to the first median filter 216.

At the first median filter 216, a median filtering operation is performed on each of the second set of motion vectors fed from the edge point motion vector detector 214 through the use of an appropriate filtering window. For instance, if the first median filter 216 has a 3×3 filtering window, the first median filter 216 at a given non-selected edge point, e.g. EP2, as shown in FIG. 3, averages seven motion vectors for edge points, which are included in a filtering window FW, by multiplying predetermined filter coefficients thereto; and assigns the averaged value as a filtered motion vector of the non-selected edge point EP2. The filtering operation on the second set of motion vectors is continued until an error value between a current averaged value and a previous average value or an original value is not greater than a predetermined value. Each of the filtered motion vectors for the second set is provided from the first median filter 216 to the quasi-point detector 218.

Based on the edge point information from the edge detector 209, the first set of motion vectors from the feature point motion vector detector 212 and the second set of filtered motion vectors from the first median filter 216, the quasi-point detector 218 determines quasi-feature points and quasi-edge points in the current frame by shifting each of the feature points and the edge points by the motion vector thereof; and provides a third set of motion vectors for the quasi-feature points and a fourth set of motion vectors for the quasi-edge points. Since each of the first and the second sets of motion vectors represents the displacement between a pixel point in the current frame shifted from its corresponding pixel point in the previous frame, the magnitude of each of the motion vectors in the third and the fourth sets is identical to that of the corresponding motion vector in the first and second sets, except that the directions of the two motion vectors are opposite each other. The third and the fourth sets of motion vectors from the quasi-point detector 218 are provided via a line L16 to a non-quasi-point motion vector detector 220, a second median filter 222 and an arrangement block 224.

The non-quasi-point motion vector detector 220 detects a fifth set of motion vectors for all non-quasi-edge and non-quasi-feature points. The non-quasi-edge and non-quasi-feature points represent all of the remaining pixel points in the current frame excluding both the quasi-edge points and the quasi-feature points, and, hereinafter, each of them shall be called as "a non-quasi-point". Each of the fifth set of motion vectors for non-quasi-points is determined by averaging the motion vectors of one or more neighboring quasi-feature points for each of the non-quasi-points, wherein the one or more neighboring quasi-feature points are placed within a circular boundary having a combined radius of a variable distance from each of the non-quasi-points to a nearest quasi-feature point corresponding thereto and a predetermined size of a fixed distance.

Figure 4:
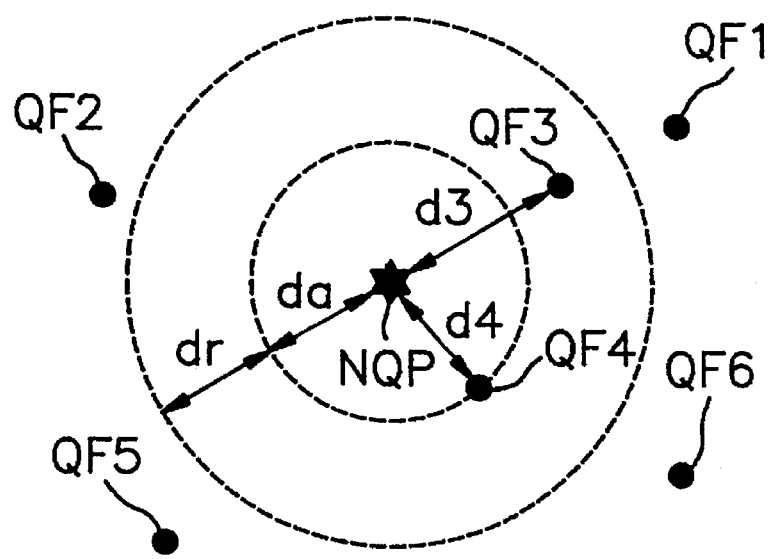
FIG. 4 represents a method for detecting the motion vectors for non-quasi-points.

For instance, as shown in FIG. 4, a number of quasi-feature points, e.g., QF1 to QF6, is irregularly distributed in the entire current frame. A motion vector of a given non-quasi-point, i.e., a star marked point NQP, is determined by averaging the motion vectors for the quasi-feature points, e.g., QF3 and QF4, which are placed within a circle boundary having a radius of "da+dr", wherein "da" is the distance to the nearest quasi-feature point from the star marked non-quasi point, and "dr" is a predetermined expanded radius for including other quasi-feature points to be used in the motion vector calculation. If the nearest quasi-feature point is QF4, and the quasi-feature point QF3 is located within the boundary of "da+dr", the motion vector $(MV_x, MV_y)_{NQP}$ for the non-quasi-point NQP may be calculated as:

$$(MV_x, MV_y)_{NQP} = \quad \text{Eq. (2)}$$

-continued $$\frac{\frac{1}{d3}(MV_x, MV_y)_{QF3} + \frac{1}{d4}(MV_x, MV_y)_{QF4}}{\frac{1}{d3} + \frac{1}{d4}}$$

wherein d3 and d4 are distances from the non-quasi-point NQP to the quasi-feature points QF3 and QF4, respectively; and, $(MV_x, MV_y)_{QF3}$ and $(MV_x, MV_y)_{QF4}$ are the respective motion vectors for the quasi-feature points QF3 and QF4; and $MV_x$ and $MV_y$ have the same meanings as in Eq. (1). The fifth set of motion vectors for the non-quasi-points is provided to a second median filter 222.

At the second median filter 222, a median filtering operation is performed on each of the fifth set of motion vectors fed from the non-quasi-point motion vector detector 220 through the use of an appropriate filtering window. The filtering operation of the second median filter 222 is identical to that of the first median filter 216. The filtered motion vectors for the non-quasi-points are provided to the arrangement block 224.

The arrangement block 224 arranges the third set of motion vectors for the quasi-feature points, the filtered motion vectors for the quasi-edge points and the filtered motion vectors for the non-quasi-points in order to determine a group of motion vectors for all of the pixels in the current frame. The group of motion vectors for all of the pixels in the current frame is sent to a motion compensator 226.

The motion compensator 226 provides a pixel value from the previous frame stored in the second frame memory 124 (shown in FIG. 1) based on the position data of each pixel in the current frame and a motion vector thereof, to thereby determine the predicted current frame.

While the present invention has been shown and described with respect to the particular embodiments, it will be apparent to those skilled in the art that many changes and modifications may be made without departing from the spirit and scope of the invention as defined in the appended claims.

What is claimed is:

1. An apparatus, for use in a motion-compensated video signal encoder, for determining a predicted current frame based on a current frame and a previous frame of a digital video signal, comprising:

means for detecting edge points representative of pixels forming edges of an image in the previous frame;

means for selecting a number of pixels among the edge points in the previous frame as feature points;

means for detecting a first set of motion vectors for the feature points, each of the first set of motion vectors representing a spatial displacement between one of the feature points and a most similar pixel thereto in the current frame;

means for, in each of the edges, detecting one or two neighboring feature points for each of the non-selected edge points, and detecting a second set of motion vectors for the non-selected edge points, each of the second set of motion vectors being determined by averaging the motion vectors of said one or two neighboring feature points;

means for detecting quasi-feature points in the current frame corresponding to the feature points and a third set of motion vectors for the quasi-feature points based on each of the first set of motion vectors and detecting quasi-edge points in the current frame based on each of the second set of motion vectors and a fourth set of motion vectors for the quasi-edge points;

means for detecting a fifth set of motion vectors for all non-quasi-edge and non-quasi-feature points, each of the fifth set of motion vectors being determined by averaging the motion vectors of one or more neighboring quasi-feature points for each of the non-quasi-edge and non-quasi-feature points, wherein said one or more neighboring quasi-feature points are placed within a circular boundary having a combined radius of the distance from each of the non-quasi-edge and non-quasi-feature points to a nearest quasi-feature point corresponding thereto and a predetermined distance;

means for arranging the third, the fourth and the fifth sets of motion vectors to determine a group of motion vectors for all of the pixels in the current frame; and means for providing a pixel value from the previous frame based on the position data of each pixel in the current frame and a motion vector thereof, to thereby determine the predicted current frame.

2. The apparatus in accordance with claim 1, which further comprises means for filtering the second set of motion vectors.

3. The apparatus in accordance with claim 2, which further comprises means for filtering the fifth set of motion vectors.

* * * * *